(12) United States Patent
Morimoto

(10) Patent No.: US 12,735,117 B2
(45) Date of Patent: Sep. 15, 2026

(54) VEHICLE REAR STRUCTURE

(71) Applicant: TOYOTA JIDOSHA KABUSHIKI KAISHA, Aichi-ken (JP)

(72) Inventor: Hideyuki Morimoto, Toyoake (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 282 days.

(21) Appl. No.: 18/418,340

(22) Filed: Jan. 22, 2024

(65) Prior Publication Data

US 2024/0246614 A1 Jul. 25, 2024

(30) Foreign Application Priority Data

Jan. 25, 2023 (JP) ................................ 2023-009237

(51) Int. Cl.
*B62D 25/16* (2006.01)

(52) U.S. Cl.
CPC .................................. *B62D 25/16* (2013.01)

(58) Field of Classification Search
CPC .......... B62D 25/16; B62D 25/18; B60R 19/24
See application file for complete search history.

(56) References Cited

U.S. PATENT DOCUMENTS 7,625,021 B2 * 12/2009 Naik

FOREIGN PATENT DOCUMENTS

| | | | | |
|---|---|---|---|---|
| JP | S61-006453 | U | | 1/1986 |
| JP | H10230801 | A | * | 9/1998 |
| JP | 2000103365 | A | | 4/2000 |
| KR | 1020070040044 | A | | 4/2007 |

OTHER PUBLICATIONS

Translation of JP H10230801 A relied upon in the office action. (Year: 1998).*

* cited by examiner

*Primary Examiner* — James A Shriver, II
*Assistant Examiner* — Nicholas R. Kandas
(74) *Attorney, Agent, or Firm* — HAUPTMAN HAM, LLP

(57) ABSTRACT

A vehicle rear structure comprises a rear bumper, and, a standing wall integral with or separate from the rear bumper, wherein the rear bumper comprises: a side wall forming a side surface of the vehicle at a rear side of a rear wheel; and a horizontal flange extending inward in a vehicle width direction from a lower end of the side wall, and the standing wall extends upward from an edge of the horizontal flange at an inner side in the vehicle width direction.

5 Claims, 6 Drawing Sheets

VEHICLE REAR STRUCTURE

CROSS REFERENCE TO RELATED APPLICATION

This application claims priority to Japanese Patent Application No. 2023-009237 filed on Jan. 25, 2023, which is incorporated herein by reference in its entirety including the specification, claims, drawings, and abstract.

TECHNICAL FIELD

This specification discloses a vehicle rear structure.

BACKGROUND

Normally, a rear bumper is disposed at a rear portion of the vehicle. A part of the rear bumper is adjacent to the rear side of the vehicle with respect to the rear wheel. A part of the rear bumper constitutes a side surface of the vehicle. Hereinafter, a portion of the rear bumper constituting a side surface of the vehicle is referred to as a “side wall”. Normally, the lower part of the side wall is bent toward the inside of the vehicle to form a horizontal flange.

In such a configuration, mud, water, and snow (hereinafter referred to as “moisture”) splashed by the rear wheel hit the side wall and then fall on the horizontal flange. Patent Document 1 discloses a rear bumper in which holes for mud are formed in the horizontal flange. According to the configuration described in Patent Document 1, moisture falls from a hole for mud. This suppresses a large amount of moisture from being retained in the horizontal flange.

However, in a low temperature environment such as winter, moisture may remain in the horizontal flange and ice. The ice may grow gradually into an ice column by repeating the adhesion of another moisture to the ice frozen on the horizontal flange and freezing. Then, ice hanging down from the horizontal flange may collide with protrusions on the ground surface. In this case, an impact is transmitted to the rear bumper via the ice, and the rear bumper is damaged or dropped from the vehicle.

Accordingly, the present specification discloses a vehicle rear structure capable of more effectively preventing the rear bumper from being damaged and dropped due to ice.

CITATION LIST

PATENT DOCUMENT1: JPS61-006453 U

SUMMARY

A vehicle rear structure disclosed herein comprises a rear bumper; and, a standing wall integral with or separate from the rear bumper, wherein the rear bumper comprises: a side wall forming a side surface of the vehicle at a rear side of a rear wheel; and a horizontal flange extending inward in a vehicle width direction from a lower end of the side wall, and the standing wall extends upward from an edge of the horizontal flange at an inner side in the vehicle width direction.

With this configuration, the edge of the horizontal flange is prevented from being sandwiched in the vertical direction by the ice. In this case, the coupling force between the ice and the rear bumper is small. Therefore, when an impact is input to the ice, the ice is easily separated from the rear bumper, and the impact is not transmitted to the rear bumper. As a result, the rear bumper is effectively prevented from being damaged and dropped.

In this case, the standing wall may be curved or bent in a plan view such that a rear end of the standing wall is positioned more inward in the vehicle width direction than a front end of the standing wall, and the rear end of the standing wall may reach a rear wheel inner line formed by extending an end surface of the rear wheel at an inner side in the vehicle width direction toward the rear side of the vehicle.

Since the standing wall reaches the rear wheel inner line, much of the moisture splashed by the rear wheel impinges on the standing wall. In other words, much of the moisture splashed by the rear wheel does not reach over the horizontal flange. As a result, ice is effectively prevented from depositing on the horizontal flange.

The vehicle rear structure may further comprises: a fender liner standing in a substantially arc shape from a vicinity of a front end of the horizontal flange along a circumferential surface of the rear wheel.

The fender liner prevents moisture splashed by the rear wheel from entering the space between the side wall and the standing wall. As a result, ice is effectively prevented from depositing on the horizontal flange.

The standing wall may have a first surface facing the side wall and a second surface facing inward in the vehicle width direction, and a plurality of ribs protruding toward the side wall may be formed on the first surface, whereas no ribs are formed on the second surface.

By forming the ribs on the first surface, the strength of the standing wall is improved. On the other hand, by not forming the ribs on the second surface, the wind flows smoothly along the second surface without being obstructed by the ribs. As a result, the steering stability of the vehicle is improved.

The standing wall may be separate from the rear bumper and fastened to the rear bumper by a fastening member.

By making the standing wall separate from the rear bumper, the shape of the rear bumper can be simplified. As a result, the manufacturing cost of the rear bumper can be reduced.

According to the rear bumper disclosed in the present specification, damage and drop-off of the rear bumper due to ice can be more effectively prevented.

BRIEF DESCRIPTION OF DRAWINGS

Embodiment(s) of the present disclosure will be described based on the following figures, wherein.

DESCRIPTION OF EMBODIMENT

Figure 1:
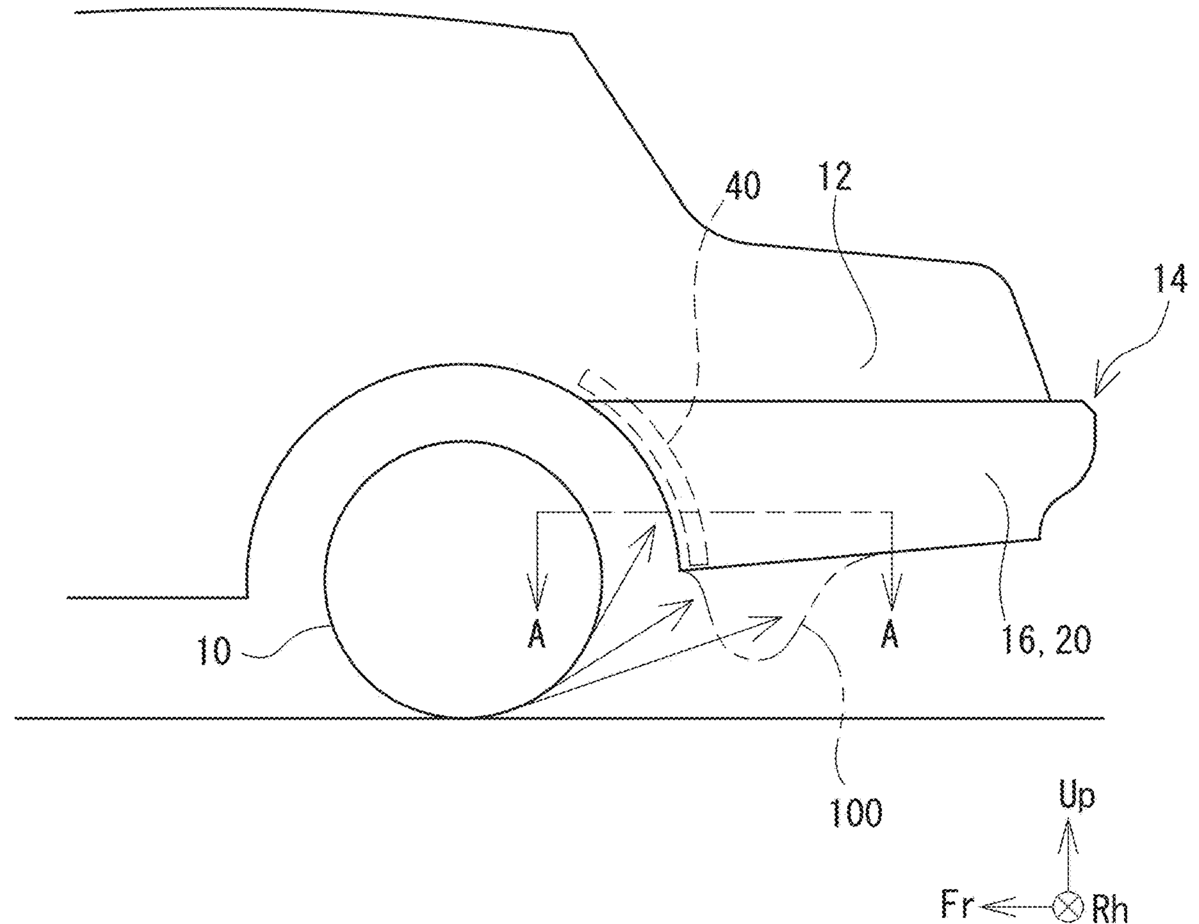
FIG. 1 is a side view of a rear portion of a vehicle.
Figure 2:
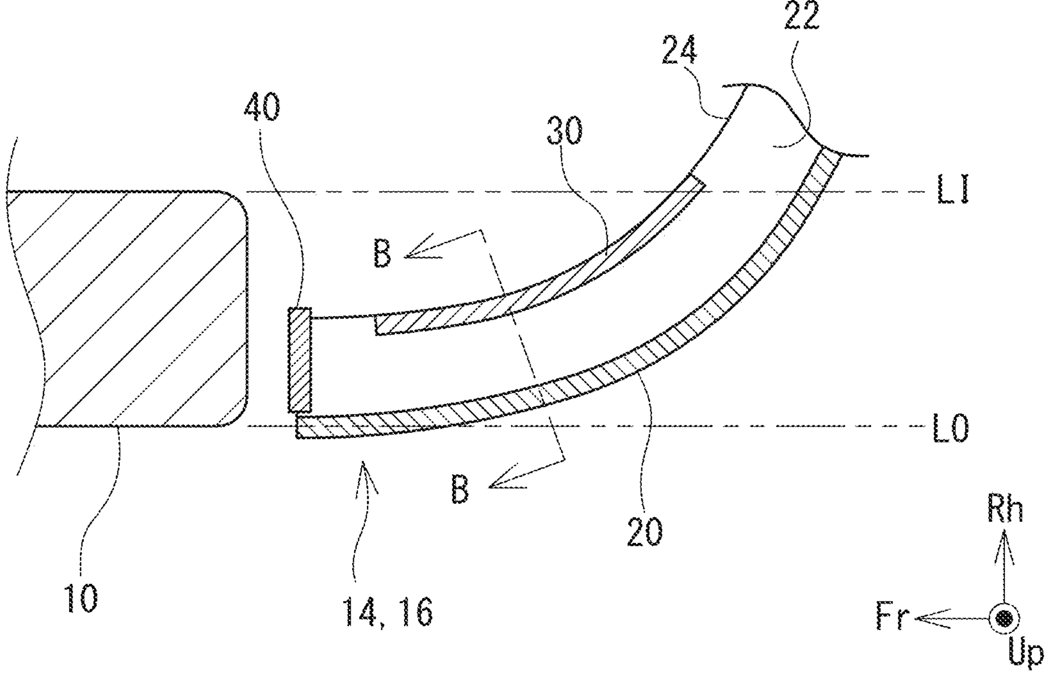
FIG. 2 is a cross-sectional view taken along the line A-A of FIG. 1.
Figure 3:
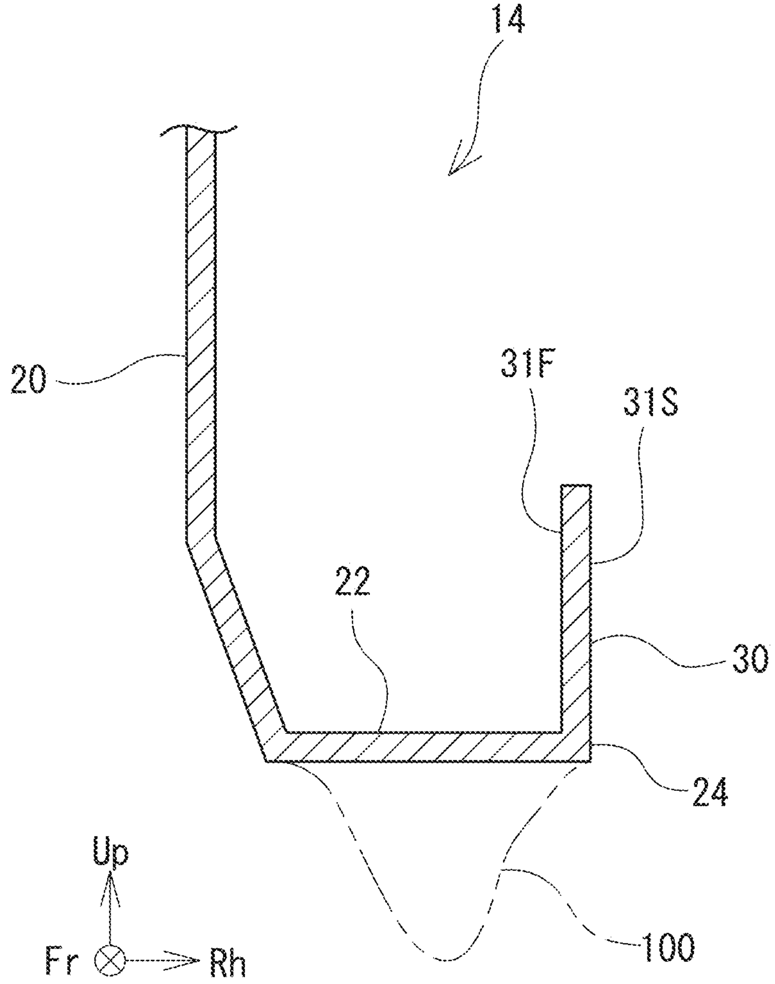
FIG. 3 is a cross-sectional view taken along the line B-B of FIG. 2.

Hereinafter, a vehicle rear structure will be described with reference to the drawings. FIG. 1 is a side view of a rear portion of a vehicle; FIG. 2 is a cross-sectional view taken along a line A-A of FIG. 1, and FIG. 3 is a cross-sectional view taken along a line B-B of FIG. 2. In the following drawings, "Fr", "Up" and "Rh" indicate the front side of the vehicle, the upper side of the vehicle, and the right side of the vehicle, respectively. In addition, in the following description, as shown in FIG. 2, an extension line formed by extending the end surface of the rear wheel 10 at the outer side in the vehicle width direction toward the rear side of the vehicle is referred to as a "rear wheel outer line LO", and an extension line formed by extending the end surface of the rear wheel 10 at the inner side in the vehicle width direction toward the rear side of the vehicle is referred to as a "rear wheel inner line LI".

As shown in FIG. 1, a rear bumper 14 is disposed at the rear of the vehicle. The rear bumper 14 is a member extending in the vehicle width direction at the rear end of the vehicle. Both ends of the rear bumper 14 in the vehicle width direction are curved toward the front of the vehicle so as to conform to the shape of the rear corner of the vehicle, and constitute a side portion 16.

As shown in FIGS. 2 and 3, the side portion 16 includes a side wall 20, a horizontal flange 22, and a standing wall 30. As shown in FIG. 1, the side wall 20 is a wall constituting a side surface of the vehicle, and is adjacent to the rear side of the vehicle with respect to the rear wheel 10. The lower edge of the side wall 20 is inclined in the forward downward direction.

The front edge of the side wall 20 is substantially arc-shaped along the peripheral surface of the rear wheel 10 when viewed from the side. A fender panel 12 is disposed above the side wall 20. A part of the lower end edge of the fender panel 12 is also substantially arc-shaped along the peripheral surface of the rear wheel 10. The substantially arc-shaped portion of the fender panel 12 and the front end of the side wall 20 form a wheel arch surrounding the rear wheel 10.

As shown in FIG. 2, in a plan view, the side wall 20 is curved so as to extend inward in the vehicle width direction as it extends rearward of the vehicle. Further, the front end of the side wall 20 is positioned on the line of the rear wheel outer line LO or slightly outside the rear wheel outer line LO in the vehicle width direction. The side wall 20 extends more inward in the vehicle width direction than the rear wheel inner line LI in the process of extending rearward of the vehicle.

As shown in FIGS. 2 and 3, the horizontal flange 22 is a wall extending inward in the vehicle width direction from the lower end of the side wall 20. As described above, since the lower end of the side wall 20 is inclined in the forward downward direction, the horizontal flange 22 extending from the lower end of the side wall 20 is also inclined in the forward downward direction. As shown in FIG. 2, the width of the horizontal flange 22 is slightly different depending on the location, but is smaller than the width of the rear wheel 10. Hereinafter, the inner edge of the horizontal flange 22 in the vehicle width direction is referred to as an "inner edge 24". The front end of the inner edge 24 is positioned outside the rear wheel inner line LI in the vehicle width direction. Further, the inner edge 24 is curved so as to extend inward in the vehicle width direction as it extends rearward of the vehicle. Therefore, the inner edge 24 straddles the rear wheel inner line LI in the course of traveling rearward of the vehicle.

As shown in FIGS. 2 and 3, the standing wall 30 is a wall extending upward from the inner edge 24 of the vehicle. The vertical dimension of the standing wall 30 is not particularly limited as long as the horizontal flange 22 can be prevented from being pinched by the ice 100, which will be described later. For example, the standing wall 30 may be about 10 cm. The standing wall 30 extends along the inner edge 24 from a position slightly rearward from the front end of the horizontal flange 22. Accordingly, like the inner edge 24, the standing wall 30 is curved so as to extend inward in the vehicle width direction as it extends rearward of the vehicle. The standing wall 30 extends to a position slightly beyond the rear wheel inner line LI in plan view. In the following description, a surface of the standing wall 30 facing the side wall 20 is referred to as a "first surface 31F" and an opposite surface thereof is referred to as a "second surface 31S".

As shown in FIGS. 1 and 2, a fender liner 40 is disposed immediately behind the rear wheel 10. The fender liner 40 is a member for receiving mud, water, and snow splashed by the rear wheel 10. The fender liner 40 is a substantially arc-shaped member extending along the peripheral surface of the rear wheel 10. The fender liner 40 rises from the vicinity of the front end of the horizontal flange 22, and has substantially the same width as the horizontal flange 22. By disposing the fender liner 40, moisture splashed by the rear wheel 10 can be effectively prevented from entering the space between the side wall 20 and the standing wall 30.

Figure 4:
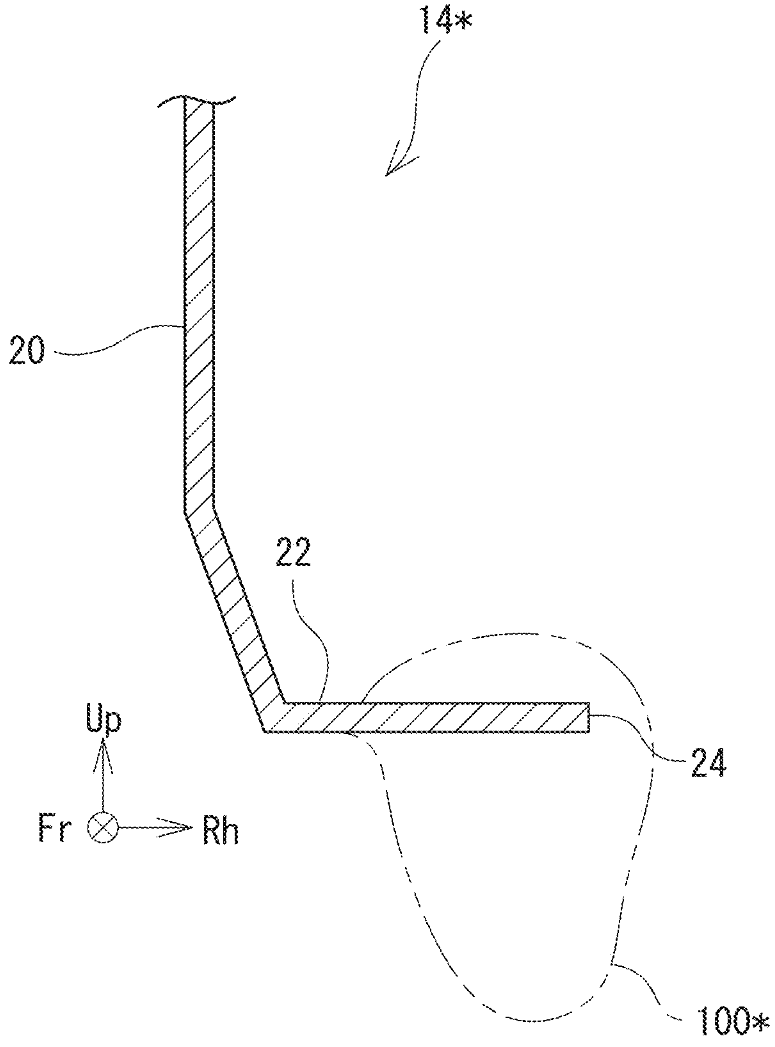
FIG. 4 is a cross-sectional view of a rear bumper of a comparative example.
Figure 5:
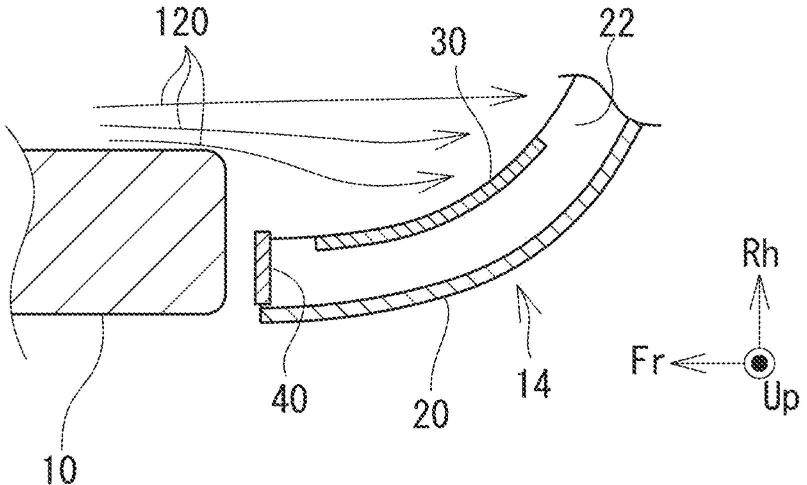
FIG. 5 is a diagram illustrating a flow of wind under a floor of a vehicle.
Figure 5:
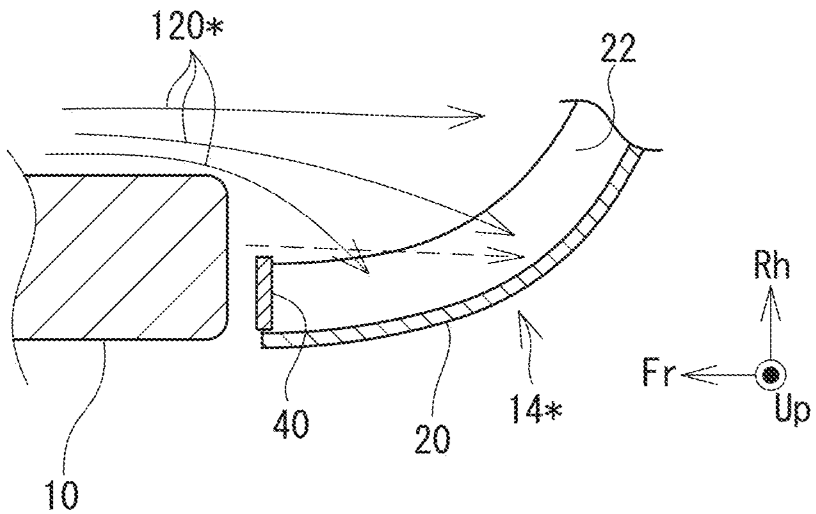

Next, the reason why the standing wall 30 is provided will be described in comparison with the rear bumper 14* of the comparative example. FIG. 5 and FIG. 4 are cross-sectional views of a rear bumper 14* of a comparative example. As shown in FIG. 4, the rear bumper 14* of the comparative example has a side wall 20 and a horizontal flange 22, but does not have a standing wall 30. In this case, the horizontal flange 22 may be sandwiched in the vertical direction by the ice 100 in a low temperature environment such as winter.

That is, as the vehicle runs, water, mud, snow, i.e., moisture on the road surface is bounced toward the side portion 16. A part of the bounced moisture collides with the fender liner 40 and falls. In the lower part of FIG. 5, as indicated by a broken arrow, another part of the moisture passes through the side of the fender liner 40, and collides with the side wall 20 of the rear bumper 14*. The moisture that collides with the side wall 20 then falls to the upper surface of the horizontal flange 22 by gravity. In a warm environment, such moisture falls off the horizontal flange 22 over time. However, under a low temperature environment, moisture attached to the horizontal flange 22 is frozen before falling from the horizontal flange 22. In particular, when snow or shower bet-like water falls on the horizontal flange 22, these snow and water are frozen in a short time. The ice 100* formed in the horizontal flange 22 is small in the initial stage. However, after that, the ice 100* attached to the horizontal flange 22 grows into an ice column shape by repeating the adhesion and freezing of moisture to the ice 100*. The ice-column-shaped ice 100* thus formed sandwiches the horizontal flange 22 in the vertical direction as indicated by the two-dot chain line in FIG. 4.

When the vehicle runs in this state, the projection on the road surface may collide with the ice 100*. At this time, since the ice 100* sandwiches the horizontal flange 22 in the vertical direction, the ice 100* is not easily detached from the horizontal flange 22. As a result, a large impact is input to the rear bumper 14 via the ice 100*, and the rear bumper 14 may be damaged or dropped from the vehicle.

On the other hand, as described above, the rear bumper 14 disclosed in the present specification has the standing wall 30 standing from the inner edge 24 of the horizontal flange 22. By providing such a standing wall 30, much of the moisture splashed by the rear wheel 10 collides with the fender liner 40 or the standing wall 30 before colliding with the side wall 20. As a result, moisture is less likely to collide with the side wall 20, and moisture is less likely to accumulate on the horizontal flange 22.

Here, under a low temperature environment, moisture that collides with the standing wall 30 may be frozen before falling off the rear bumper 14. The ice 100 adhered to the rear bumper 14 may grow in an ice column shape. The two-dot chain line in FIG. 3 shows the ice 100 thus grown. That is, large ice 100 may adhere to the rear bumper 14 having the standing wall 30.

However, as is apparent from FIG. 3, in this case, the ice 100 mainly adheres to the bottom surface of the horizontal flange 22 or the second surface 31S of the standing wall 30. In other words, the ice 100 does not sandwich the horizontal flange 22 in the vertical direction. In this case, the coupling force between the ice 100 and the rear bumper 14 is smaller than that in the case of FIG. 4. Therefore, when an impact is input to the ice 100, the ice 100 is easily separated and dropped from the rear bumper 14. As a result, when the rear bumper 14 has the standing wall 30, damage and detachment of the rear bumper 14 are effectively prevented.

Further, the presence of the standing wall 30 can improve the steering stability of the vehicle. This will be described with reference to FIG. 5. FIG. 5 is a diagram illustrating the flow of winds 120 and 120* under the floor of the vehicle. The upper part of FIG. 5 shows the rear bumper 14 having the standing wall 30, and the lower part of FIG. 5 shows the rear bumper 14* of the comparative example having no standing wall 30.

When the vehicle runs, winds 120 and 120* flowing rearward of the vehicle are generated under the floor of the vehicle. In the case of the rear bumper 14* of the comparative example without the standing wall 30, a part of the wind 120* flows in the direction of the side wall 20 after passing through the side of the rear wheel 10. As a result, in the case of the rear bumper 14* of the comparative example, the wind 120* tends to stagnate at the rear of the rear wheel 10. Such strayness of the wind 120* causes a decrease in steering stability of the vehicle.

On the other hand, in the case of the rear bumper 14 having the standing wall 30, the wind 120 is rectified by the standing wall 30. As a result, at the rear of the rear wheel 10, the wind 120 flows toward the rear side of the vehicle without sticking. Since the wind 120 smoothly flows, the steering stability of the vehicle is improved.

Figure 6:
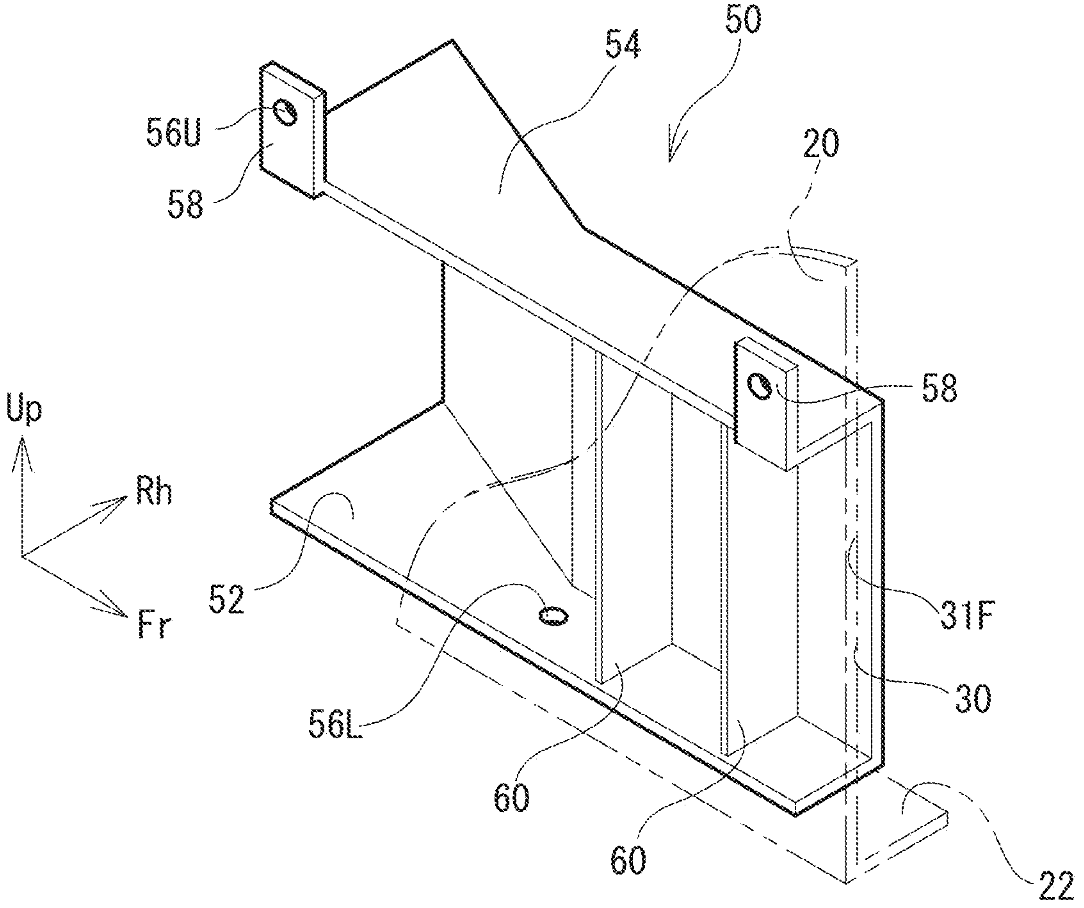
FIG. 6 is a perspective view of separate component having a standing wall.

In the above description, the standing wall 30 is integrated with the rear bumper 14. However, the standing wall 30 may be a separate component 50 that can be separated from the rear bumper 14. FIG. 6 is a diagram showing an example of separate component 50 having a standing wall 30. In this case, the rear bumper 14 does not have the standing wall 30. The separate component 50 includes the standing wall 30, a bottom wall 52 extending from the lower end of the standing wall 30 to the vehicle width direction inner side, and a top wall 54 extending from the upper end of the standing wall 30 to the vehicle width direction outer side. By providing the standing wall 30 on the separate component 50 that can be separated from the rear bumper 14, the shape of the rear bumper 14 can be simplified. As a result, the manufacturing cost of the rear bumper 14 can be reduced.

The bottom wall 52 is superimposed on the horizontal flange 22. A lower fastening hole 56L is formed in the bottom wall 52. The bottom wall 52 is fastened to the horizontal flange 22 by a fastening member (for example, a clip or the like) inserted through the lower fastening hole 56L. Two fastening pieces 58 stand upright from the top wall 54. The fastening piece 58 is laminated on the side wall 20 in the vehicle width direction. An upper fastening hole 56U is formed in the fastening piece 58. The fastening piece 58 is fastened to the side wall 20 by a fastening member (for example, a clip or the like) inserted through the upper fastening hole 56U.

Further, the separate component 50 has a plurality of ribs 60. The rib 60 stands from the first surface 31F of the standing wall 30 toward the side wall 20. By providing the ribs 60, the strength of the separate component 50 is improved. The ribs 60 are not formed on the second surface 31S of the side wall 20. With this configuration, the wind 120 smoothly flows along the second surface 31S without being obstructed by the ribs 60.

Any of the configurations described above is an example. The vehicle rear structure may be appropriately changed as long as the vehicle rear structure has the configuration described in claim 1. For example, as shown in FIG. 3, when the standing wall 30 is integrated with the rear bumper 14, a rib 60 may be formed on the first surface 31F of the standing wall 30. The shape and number of the ribs 60 may be appropriately changed.

The invention claimed is:

1. A vehicle rear structure comprising:

a rear bumper; and, a standing wall integral with or separate from the rear bumper, wherein the rear bumper comprises:

a side wall forming a side surface of the vehicle at a rear side of a rear wheel; and a horizontal flange extending inward in a vehicle width direction from a lower end of the side wall, and the standing wall extends upward from an edge of the horizontal flange at an inner side in the vehicle width direction, wherein the standing wall is curved or bent in a plan view such that a rear end of the standing wall is positioned more inward in the vehicle width direction than a front end of the standing wall, and the rear end of the standing wall reaches a rear wheel inner line formed by extending an end surface of the rear wheel at an inner side in the vehicle width direction toward the rear side of the vehicle.

2. The vehicle rear structure according to claim 1, further comprising:

a fender liner standing in a substantially arc shape from a vicinity of a front end of the horizontal flange along a circumferential surface of the rear wheel.

3. The vehicle rear structure according to claim 1, wherein the standing wall has a first surface facing the side wall and a second surface facing inward in the vehicle width direction, and a plurality of ribs protruding toward the side wall are formed on the first surface, whereas no ribs are formed on the second surface.

4. The vehicle rear structure according to claim 1, wherein the standing wall is separate from the rear bumper and fastened to the rear bumper by a fastening member.

5. The vehicle rear structure according to claim 1, wherein the horizontal flange connects the side wall to the standing wall.

* * * * *